United States Patent
Naibo et al.

(10) Patent No.: US 8,447,739 B2
(45) Date of Patent: May 21, 2013

(54) SYSTEMS AND METHODS TO CREATE CONTINUOUS QUERIES VIA A SEMANTIC LAYER

(75) Inventors: Alexis Naibo, Levallois-Perret (FR); Dan C. Marinescu, Puteaux (FR); Didier Bolf, Boulogne-Billancourt (FR)

(73) Assignee: SAP France S.A., Levallois-Perret (FR)

( * ) Notice: Subject to any disclaimer, the term of this patent is extended or adjusted under 35 U.S.C. 154(b) by 624 days.

(21) Appl. No.: 12/173,979

(22) Filed: Jul. 16, 2008

(65) Prior Publication Data
US 2010/0017379 A1   Jan. 21, 2010

(51) Int. Cl.
*G06F 7/00*   (2006.01)
*G06F 17/00*  (2006.01)

(52) U.S. Cl.
USPC .......................................................... 707/688

(58) Field of Classification Search
USPC .......................................................... 707/688
See application file for complete search history.

(56) References Cited

U.S. PATENT DOCUMENTS

| | | | |
|---|---|---|---|
| 5,987,446 A | 11/1999 | Corey et al. | |
| 6,539,377 B1 | 3/2003 | Culliss | |
| 7,756,840 B2 * | 7/2010 | Warshawsky | 707/688 |
| 8,082,224 B2 | 12/2011 | Marinescu | |
| 2008/0133891 A1 | 6/2008 | Salz et al. | |
| 2008/0209078 A1 * | 8/2008 | Bates et al. | 710/10 |
| 2008/0212616 A1 | 9/2008 | Augustine et al. | |
| 2009/0037533 A1 | 2/2009 | Gilfix et al. | |
| 2009/0106214 A1 * | 4/2009 | Jain et al. | 707/4 |
| 2009/0327354 A1 | 12/2009 | Resnick et al. | |
| 2010/0017380 A1 | 1/2010 | Naibo et al. | |
| 2010/0017384 A1 | 1/2010 | Marinescu | |
| 2010/0211861 A1 | 8/2010 | Onda et al. | |

FOREIGN PATENT DOCUMENTS

| | | |
|---|---|---|
| WO | 2006/118814 A2 | 11/2006 |
| WO | 2008/040004 A2 | 4/2008 |

OTHER PUBLICATIONS

Lars Brenna and Dag Johansen, "Configuring Push-Based Web Services", IEEE Computer Society, Proceedings of the International Conference on Next Generation Web Services Practices (NWebSP'05), 0-7605-2452-4, Copyright 2005 IEEE, 6pgs.

(Continued)

*Primary Examiner* — Fred I Ehichioya
*Assistant Examiner* — Kris Mackes
(74) *Attorney, Agent, or Firm* — Buckley, Maschoff & Talwalkar LLC

(57) ABSTRACT

A system, method, means, and/or computer program code may be provided to facilitate a presentation of information to a user. According to some embodiments, continuous query definition parameters are created by a user via a graphical user interface. Moreover, semantic layer information associated with an event processing engine may be provided. The event processing engine may, for example, receive an event stream from a data source. According to some embodiments, the semantic layer information is defined by a semantic layer designer via a graphical user interface. At least one event processing language statement may be created based on (i) the continuous query definition parameters and (ii) the semantic layer information. The statement may then be provided to the event processing engine so as to establish a continuous query at the event processing engine, the continuous query providing output data based on events in the event stream. According to some embodiments, a continuous meta-query for a complex event processing engine is initially created. When a connection with a business user is subsequently established, a continuous user-query is initiated based on the continuous meta-query.

15 Claims, 13 Drawing Sheets

OTHER PUBLICATIONS

Wikipedia, the free encyclopedia, "Complex Event Processing", Retrieved Jul. 2, 2008. Retrieved from Internet: URL: http://en.wikipedia.org/wiki/Complex_Event_Processing, 2pgs.

The Complex Event Processing Resource Site, "Complex Event Processing: A New computer Model", Retrieved Jul. 2, 2008. Retrieved from Internet: URL: http://www.eventstreamprocessing.com/index.htm, 1pg.

Event processing use cases, "Applications of CEP", Retrieved Jul. 2, 2008. Retrieved from Internet: URL: http://www.eventstreamprocessing.com/CEPApplications.htm, 4pgs.

Thomas Bernhardt and Alexandre Vasseur, "Complex Event Processing Made Simple Using Esper", Apr. 2008; Enterprise Java Community, Retrieved Jul. 2, 2008, Retrieved from Internet: URL: http://www.theserverside.com/tt/articles/article.tss?l=ComplexEventProcessing, 5pgs.

"Complex Event Processing", Steambase, Retrieved Jul. 2, 2008. Retrieved from Internet: URL: http://www.streambase.com/complex-event-processing.htm, 4pgs.

"Complex Event Processing Tutorial", Retrieved Jul. 2, 2008. Retrieved from Internet: URL: http://www.eventstreamprocessing.com/CEP-tutorial.htm, 2pgs.

Gideon Low and Jags Ramnarayan, "Java Feature—Building Real-Time Applications with Continuous Query Technology", Aug. 28, 2006 05:30PM, Retrieved Jul. 2, 2008. Retrieved from Internet: URL: http://java.sys-con.com/read/260054_2.htm, 5pgs.

"Non-Final Office Action" mailed Nov. 15, 2010, for U.S. Appl. No. 12/173,951, entitled "Systems and Methods to Provide business Information Via A Push Model", filed Jul. 16, 2008, 22pgs.

"Non-Final Office Action" mailed Mar. 1, 2011, for U.S. Appl. No. 12/173,997, entitled "Systems and Methods to Create Continuous Queries Associated With Push-Type and Pull-Type Data", filed Jul. 16, 2008, 22pgs.

"Final Office Action" mailed Apr. 22, 2011, for U.S. Appl. No. 12/173,951, entitled "Systems and Methods to Provide business Information Via a Push Model", filed Jul. 16, 2008, 20pgs.

"Final Office Action" mailed Aug. 15, 2011, for U.S. Appl. No. 12/173,997, entitled "Systems and Methods to Create Continuous Queries Associated With Push-Type and Pull-Type Data", filed Jul. 16, 2008, 15pgs.

E. Albek et al., "An Event Processing Language (EPL) for Building Sense and Response Applications", Proceedings of the 19th IEEE International Parallel and Distributed Processing Symposium (IPDPS'05), 2005, Computer Society, DOI:10.1109/IPDPS.2005.97, XP010785645, ISBN:978-0-7695-2312-5, IEEE, 5pgs.

"Communication pursuant to Article 94(3) EPC", dated Aug. 19, 2010, for European Patent Application No. 09165724.7-2221, 6pgs.

Lars Brenna and Dag Jahansen, "Configuring Push-Based Web Services", Aug. 22, 2005, IEEE Computer Society, Proceedings of the International Conference on Next Generation Web Services Practices (NWebSP'05), 0-7695-2452-4, Copyright 2005 IEEE, 6pgs.

"Communication: European Search Report", dated Dec. 28, 2011, for European Application No. 09165718.9-2221 / 2169603, 6pgs.

* cited by examiner

| QUERY IDENTIFIER 1002 | CLIENT IDENTIFIER 1004 | EVENT CONDITION 1006 | WINDOW INFORMATION 1008 | CONTINUOUS META-QUERY 1010 |
|---|---|---|---|---|
| Q01 | C01 | US_SALES < $1K/SEC | LAST HOUR | MQ01 |
| Q02 | C02 | PACKAGE DELAY > 2 DAYS | CURRENT HOUR | MQ01, MQ02 |
| Q03 | http:/sample.com/sample | ERROR RATE > 5% OR OUTPUT < THRESHOLD | LAST 50 EVENTS OCCURRENCES | MQ03 |
| Q04 | username: sample password: 123 | > 100 COMPLAINTS IN 24 HOUR PERIOD | TOP 5 VALUES | MQ01, MQ02, MQ03 |

SYSTEMS AND METHODS TO CREATE CONTINUOUS QUERIES VIA A SEMANTIC LAYER

CROSS-REFERENCE TO RELATED APPLICATIONS

The present application is related to the following US Patent Applications filed concurrently herewith: (i) U.S. patent application Ser. No. 12/173,951 entitled "SYSTEMS AND METHODS TO PROVIDE BUSINESS INFORMATION VIA A PUSH MODEL" now U.S. Pat. No. 8,082,224, issue date Dec. 20, 2011, and (ii) U.S. patent application Ser. No. 12/173,997 entitled "SYSTEMS AND METHODS TO CREATE CONTINUOUS QUERIES ASSOCIATED WITH PUSH-TYPE AND PULL-TYPE DATA". The entire contents of those applications are incorporated herein by reference.

FIELD

Some embodiments of the present invention relate to business information, business intelligence, and/or enterprise systems. In particular, some embodiments relate to systems and methods using a semantic layer to create continuous queries associated with business information, such as business intelligence and/or enterprise system data.

BACKGROUND

A business intelligence and/or enterprise system can improve an organization's ability to monitor and manage data in a complex business environment. For example, the systems offered by Business Objects SA of Levallois-Perret, France and SAP AG of Walldorf, Germany, provide components and tools that allow users to monitor, retrieve, view and manipulate business information, including business warehouse data stored and event streams maintained as part of a company's overall business intelligence tools. By way of examples only, business information might be associated with a number of different product lines, profit values, customer groups, fiscal years, distribution regions, product costs, product quantities, revenues, and/or dates. Moreover, the business information may be stored and retrieved in a variety of ways. Examples of data sources include real-time data streams, events coming through notifications, and databases (e.g., relational, transactional, hierarchical, multi-dimensional, and/or object oriented databases).

In some cases, a user may want to be presented with particular information under specific conditions. For example, a user might wish to be alerted when a current rate of production falls below a pre-determined value. Similarly, a user might want to access analytic information associated with an enterprise. Typically, a client device associated with the user (e.g., his or her computer) retrieves the desired information from a server. For example, the client device might poll the server every 10 milliseconds to retrieve the latest data by periodically issuing Standard Query Language (SQL) commands to "pull" information from a relational database.

Such an approach, however, can be impractical—especially when there are a relatively large number of users and/or data items that need to be processed. For example, it can be difficult to scale a client side pull-based architecture for hundreds of users when tens of thousands of events occur per second. Moreover, it can be difficult to process large amounts of data and provide appropriate indications to a large number of users with relatively low latency (e.g., a few milliseconds between the occurrence of an event and providing notifications to appropriate users).

Moreover, a user may find it difficult to establish a query associated with one or more event streams. For example, the computer programming statements and various event parameters associated with a query may be complex and hard to define. The process may be especially time consuming and error prone for business users (who typically do not have a lot of experience working with computer programming statements).

It would be desirable to provide improved methods and systems that facilitate a presentation of business information by a user, including situations where there is a relatively large amount of data and/or a relatively large number of users. In addition, it would be desirable to facilitate the efficient creation of queries by business users.

DETAILED DESCRIPTION

Figure 1:
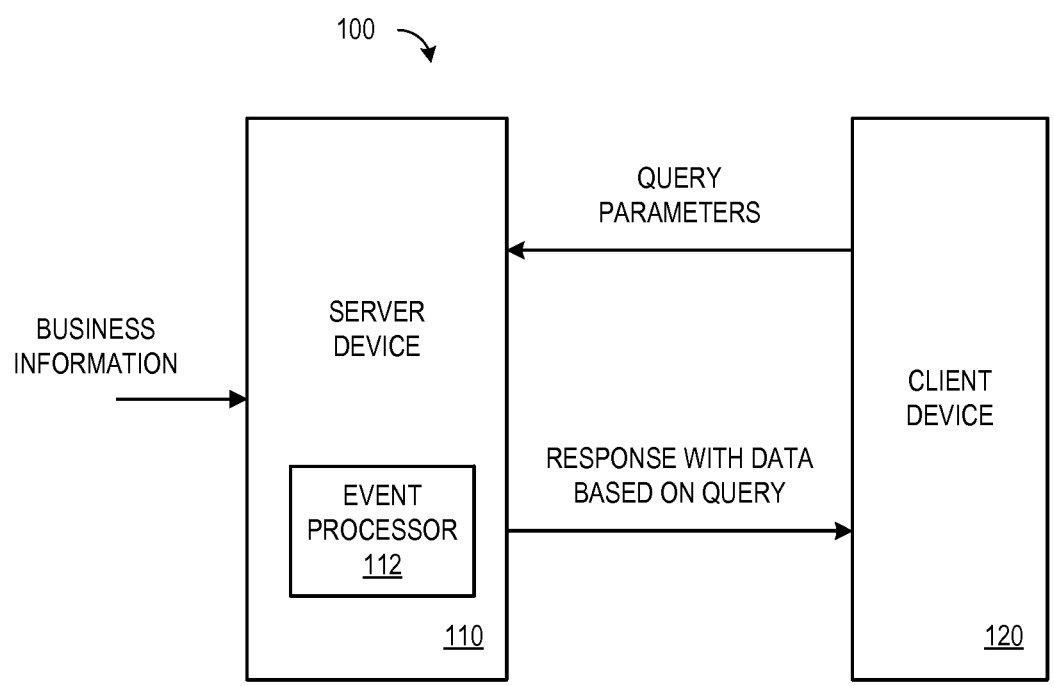
FIG. 1 is a block diagram of a system according to some embodiments of the present invention.

To alleviate problems inherent in the prior art, some embodiments of the present invention introduce systems, methods, computer program code and/or means for using a semantic layer to create continuous event queries associated with business information, such as business intelligence and/or enterprise system data. For example, FIG. 1 is a block diagram of a system 100 according to some embodiments of the present invention. The system 100 includes a server device 110, such as a device that accepts requests and/or transmits responses (e.g., Hypertext Transfer Protocol (HTTP) requests and responses) in connection with an enterprise infrastructure.

The server device 110 may also receive and/or determine "business information" associated with an enterprise. For example, the server device 110 may receive one or more streams of event data associated with an enterprise (e.g., sales volume data, profit information, and/or quality statistics). According to some embodiments, the server device 110 includes an event processor 112 to monitor streams of business information event data. The event processor 112 might, for example, detect patterns of events (event correlation), filter events, aggregate events, and/or join event streams. Such an event processor 112 may have a relatively high throughput to process large volumes of messages (e.g., 100,000 messages per second) with a relatively low latency (e.g., several milliseconds).

The server device 110 may exchange information with one or more remote client devices 120 via a communication network. The client devices 120 might be associated with, for example, Personal Computers (PCs), portable computing devices such as Personal Digital Assistants (PDAs), or any other appropriate storage and/or communication devices. As used herein, devices (including the server device 110 and client device 120) may exchange information via any communication network, such as a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

Although a single server device 110 and client device 120 are shown in FIG. 1, any number of such devices (and any other device described herein) may be included according to embodiments of the present invention. Moreover, in some embodiments, the server device 110 and client device 120 might be co-located and/or may comprise a single apparatus.

According to some embodiments, the client device 120 is adapted to display a desktop "widget" and/or a web analytic interface to a business user, a report document, or it can be running a rich Internet application that allows displaying dynamic business content. For example, a dashboard graphical component might display current sales information to a business user. Moreover, according to some embodiments a business user or system designer may define or select one or more "queries" to obtain business information of particular interest to the user. For example, a user might configure a dashboard display to provide a visual or audible alert when profit information associated with a particular region (e.g., Europe or Asia) falls below a pre-determined threshold level.

Figure 2:
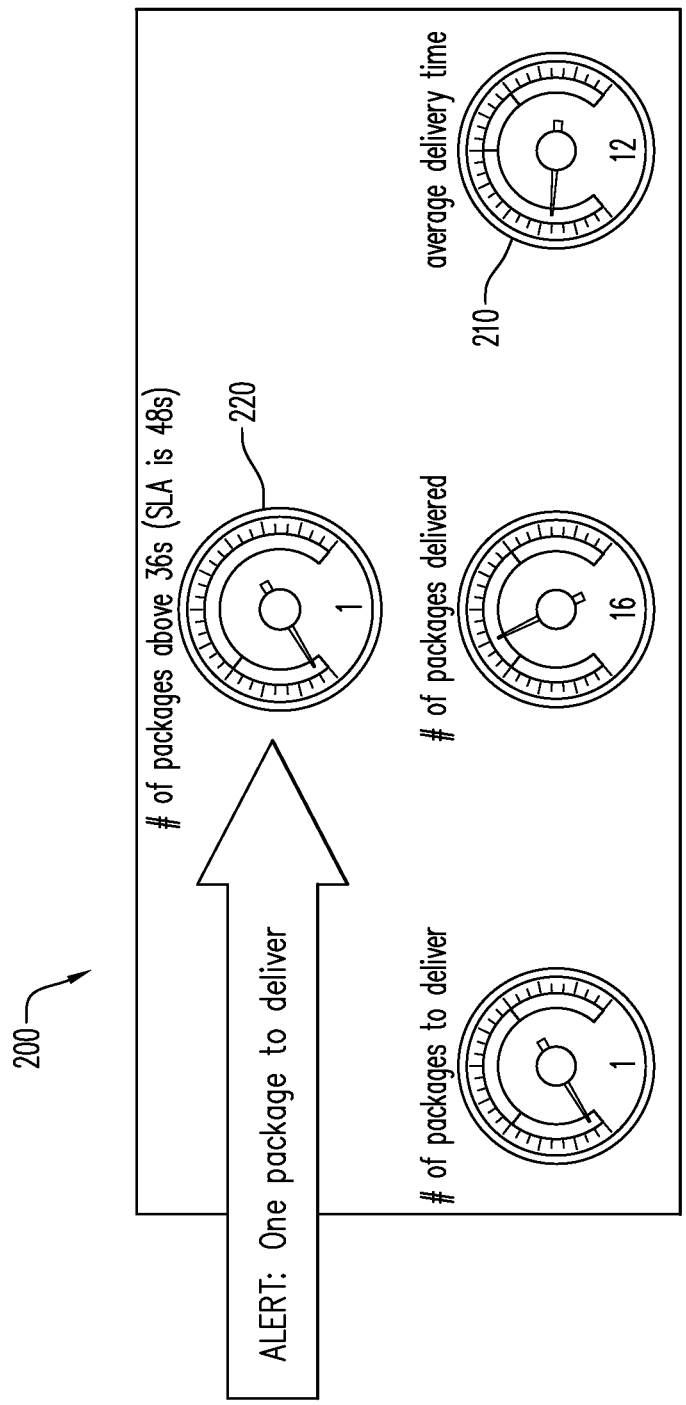
FIG. 2 illustrates a dashboard type display in accordance with some embodiments.

By way of example only, FIG. 2 illustrates a dashboard type display 200 that might be provided at a client device 120 in accordance with some embodiments. In particular, the display 200 might be associated with a Service Level Agreement (SLA) dashboard that provides event driven delivery intelligence to a business user. The display 200 may include information that is updated in substantially real-time, such as an average delivery time dial 210. The display 200 may also include one or more alerts, such as an alert dial 220 that appears when a time associated with one or more packages awaiting delivery rises above a threshold value (e.g., 36 seconds).

The client device 120 may send subscription information (e.g., including information about the particular query of interest to the user and some parameter like the threshold level) to the server device 110. The event processor 112 may then monitor the incoming business information to determine whether or not one or more conditions associated with the query are currently satisfied.

In an illustrative example, consider a manager of a delivery service who is interested in monitoring package delivery times and failures. In this case, he or she may configure a desktop widget on a client device 120 to provide an alert when the average time associated with today's deliveries falls below a target delivery time. The client device 120 might transmit a request to the server device 110 (including details of the manager's query). The server device 110 may use the event processor 112 to subscribe to the corresponding continuous query on the business information (e.g., one or more incoming event streams) and get notified when the event processor 112 determines that a condition associated with the user's continuous query is satisfied (e.g., when the average delivery time falls below the threshold value). When notified, an appropriate alert will be displayed to the manager.

Figure 3:
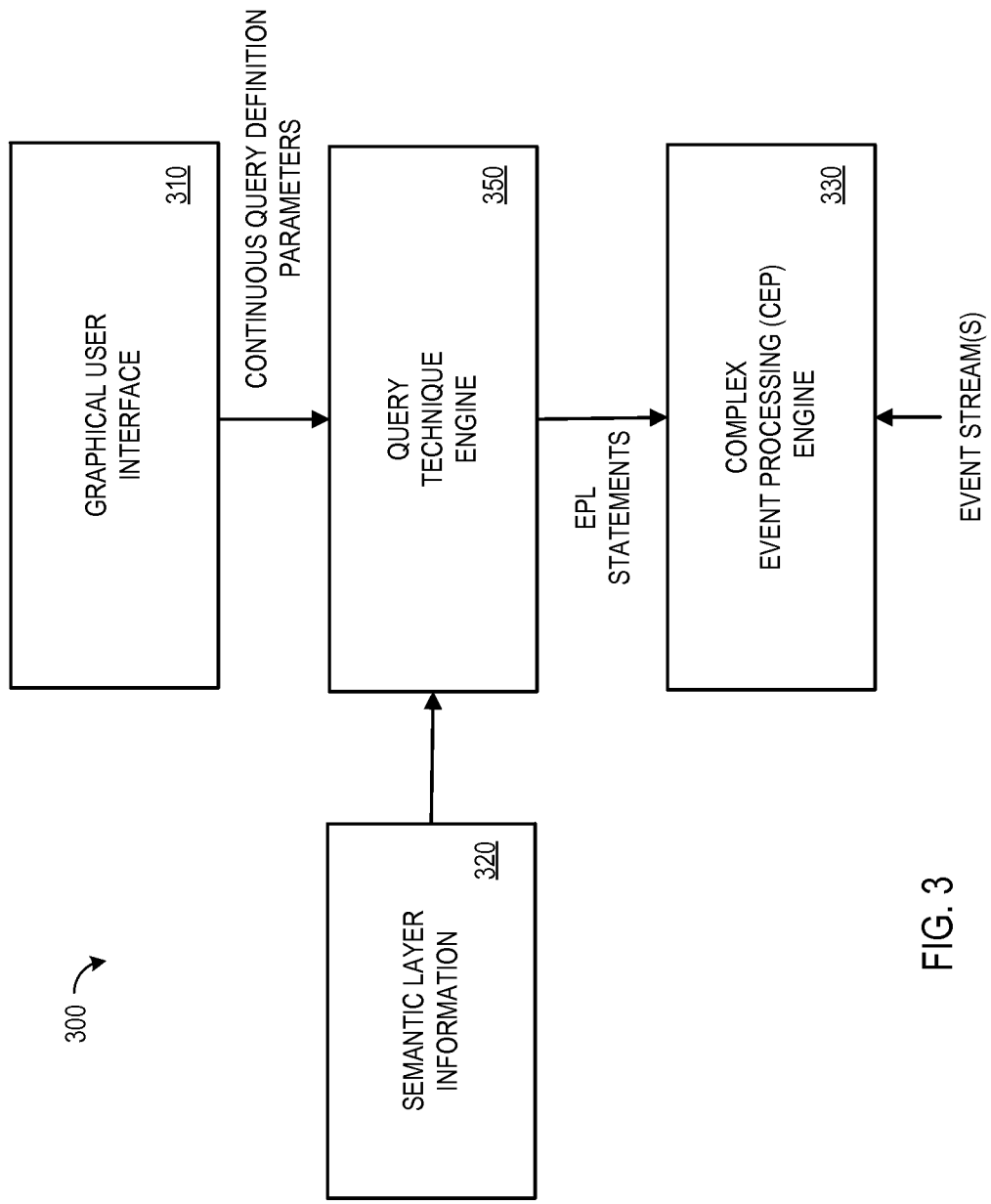
FIG. 3 is a block diagram of a server-side system according to some embodiments of the present invention.

FIG. 3 is a block diagram of a server-side system 300 according to some embodiments of the present invention. In this case, a Graphical User Interface (GUI) 310 may provide one or more continuous query definition parameters to a query technique engine 350. The continuous query definition parameters may, for example, be provided by a business user of the GUI 310 in connection with a query request and may define events that are of interest to the user.

The query technique engine 350 may also retrieve semantic layer information 320 associated with a complex event processing engine 330. The complex event processing engine may, for example, be adapted to receive multiple business information event streams.

According to some embodiments, the query technique engine 350 is adapted to automatically create a statement based on (i) the continuous query definition parameter created by the business user and (ii) the semantic layer information 320. The query technique engine 350 may provide the statement to the complex event processing engine 330 so as to establish a continuous query at the complex event processing engine 330. For example, the continuous query might provide output data (e.g., notifications) based on events in the business information event streams.

The "statement" automatically generated by the query technique engine 350 may, for example, comprise one or more Event Programming Language (EPL) statements that define queries on an event stream to address the event stream analysis requirements of complex event processor applications. Such EPL statements may provide the windows, aggregation, joining, and/or analysis functions for use with streams of events and may follow a specific EPL syntax. According to some embodiments, EPL statements contain definitions of one or more "views" that define the data available for querying and/or filtering. Note that views might be mapped on windows over a stream of events and/or staggered onto each other to build a chain of views.

When the complex event processing engine 330 determines that the event streams satisfy a condition associated with the query, information may be transmitted to a business user via a push-model (e.g., a subscription based push-model). Note that a query defined via the GUI 310 might be associated with, for example, the occurrence of a particular event in a particular stream. According to some embodiments, the query might be associated with a number of different events and/or different types of events (associated with one or more event streams). In this case a condition associated with a query may be further associated with a rule (e.g., event one occurs before event two), a logical operation (e.g., Boolean operations such as event one and event two exist at the same time or an event contains a value greater than a defined threshold value), or a formula (e.g., a value associated with event one exceeds a value associated with event two by fifty percent). Moreover, the complex event engine 330 might look for patterns among the multiple streams of event data, find event correlations, and/or perform event filtering tasks.

Further note that the business information notifications and/or events can contain data that comes from additional data sources. For example, the complex event processing engine might receive historical information related to the business information (e.g., prior sales figures), data from enterprise databases and applications, and/or information from Online Analytic Programming (OLAP) sources.

Figure 4:
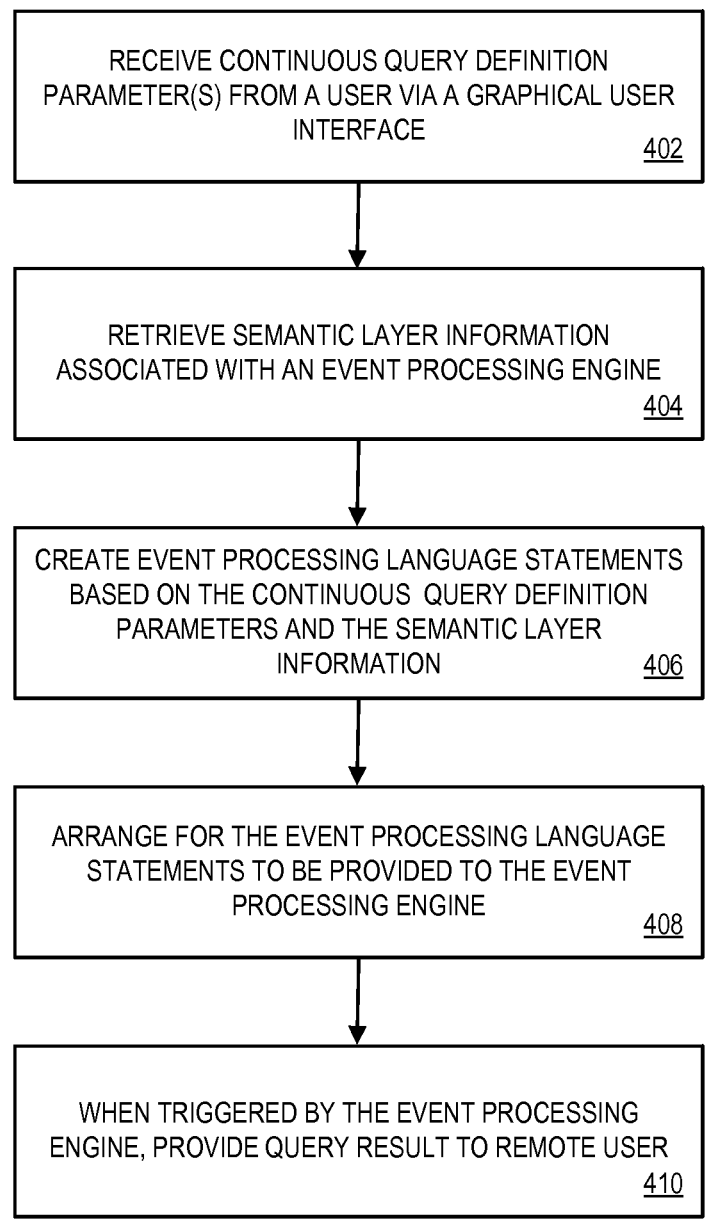
FIG. 4 is a flow diagram of a method to facilitate a presentation of information according to some embodiments.

Thus, according to some embodiments, a query technique engine 350 may be advantageously used by the system 300 to facilitate event-based query creation and a presentation of business information to a user. For example, FIG. 4 is a flow diagram of a method that may be performed by the server device 110 of FIG. 1 and/or the query technique engine 350 of FIG. 3 according to some embodiments. The flow charts described herein do not necessarily imply a fixed order to the actions, and embodiments may be performed in any order that is practicable. Note that any of the methods described herein may be performed by hardware, software (including microcode), firmware, or any combination of these approaches. For example, a storage medium may store thereon instructions that when executed by a machine result in performance according to any of the embodiments described herein. Further note that some or all of the actions may be performed using "in-memory" computations.

At 402, continuous query definition parameters are received at a query technique engine. The continuous query definition parameters may, for example, be received from a user via a GUI and might be associated with: (i) an event driven universe, (ii) an event driven query, (iii) a class, (iv) an object, (v) an adapter, (vi) a source stream, (vii) a target, and/or (viii) a filter.

At 404, semantic layer information is retrieved by the query technique engine. The semantic layer information may, for example, be associated with an event processing engine adapted to receive at least one event stream from at least one data source. The semantic layer information might include, for example: (i) schema definitions, (ii) tables defining attributes, (iii) business object metadata, (iv) metadata based on an entity relationship model, (v) a metadata name, (vi) a metadata description, (vii) a metadata object type, (viii) dimension, measure, detail, or pre-condition object definitions, (ix) a metadata data type, (x) a metadata aggregation type, (xi) metadata distinction information, (xii) metadata formula information, (xiii) stream adapter metadata, (xiv) event driven universe metadata, and/or (xv) query panel information.

At 406, processing language statements are created (e.g., are automatically created) at the query technique engine. The statements might comprise EPL statements and may be created, for example, based on (i) the continuous query definition parameters from the user and (ii) the semantic layer information.

At 408, it is arranged for the event processing language statements to be provided to the event processing engine so as to establish a continuous query at the event processing engine. The continuous query may, for example, provide output data based on events in the event stream. Note that according to some embodiments, the continuous query may be associated with an event aggregation, an event abstraction, and/or a complex event.

Responsive to the output data, information may be transmitted at 410 to a remote business user via a push-model. The transmitted information might, for example, be associated with: (i) a web service associated with a client, (ii) a desktop widget application associated with a client, (iii) a dashboard application associated with a client, (iv) a web analytic application associated with a client, and/or (v) a web browser application associated with a client. Moreover, the information might be transmitted to a remote device, such as a personal computer and/or a wireless device.

Thus, some embodiments of the present invention may provide a "push-model" wherein the server determines if (and when) information will be sent to the client. Moreover, a user can provide information via a GUI and the appropriate EPL statements may be automatically generated for the user based on information in a semantic layer.

Figure 5:
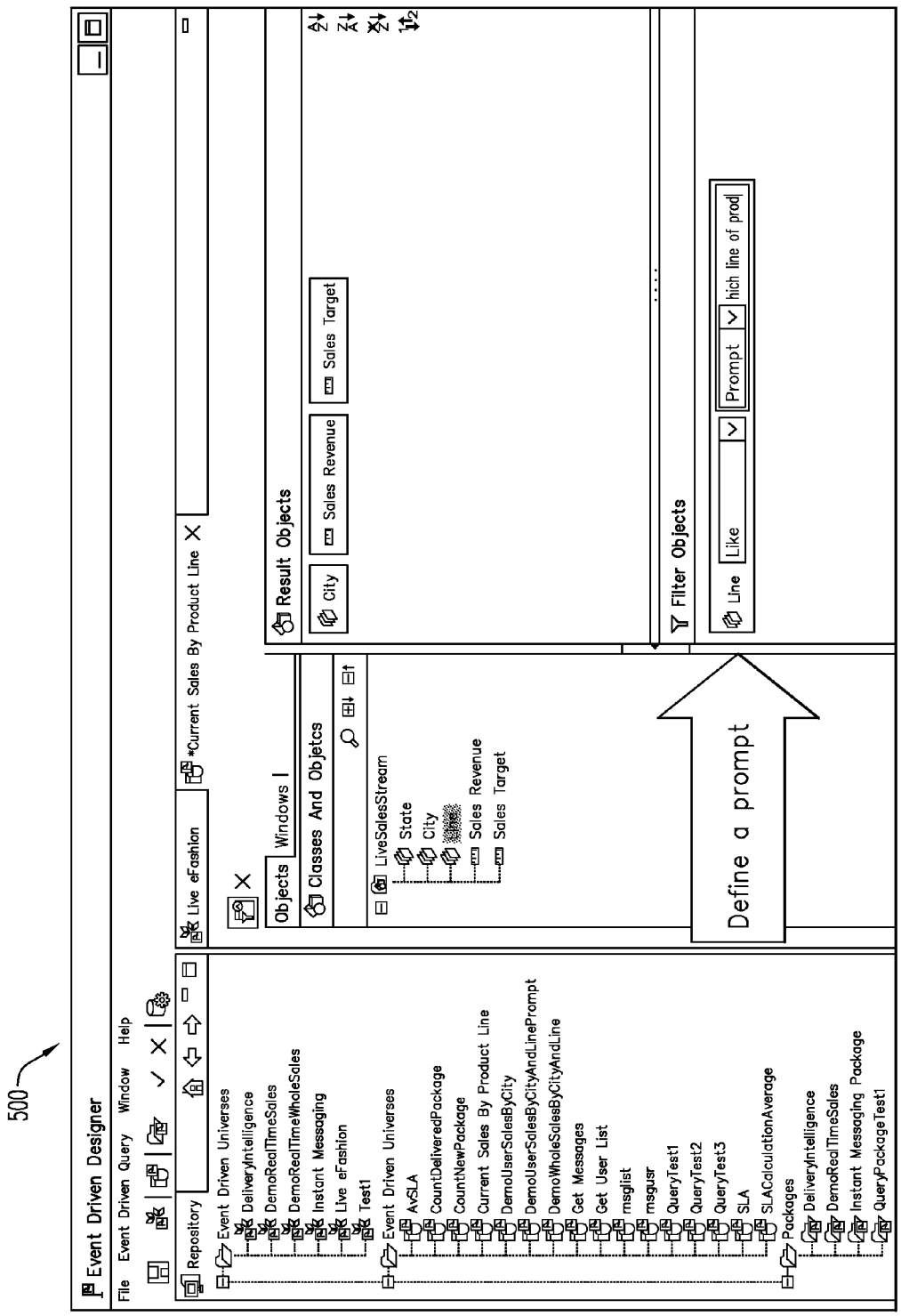
FIG. 5 illustrates a graphical user interface associated with the creation of a continuous query in accordance with some embodiments.

FIG. 5 illustrates a GUI 500 associated with the creation of a continuous query in accordance with some embodiments. In particular, the GUI 500 is associated with an event driven designer that includes repositories of event driven universes, event driven queues, and packages (e.g., each associated with multiple queries). The user may define business objects, such as result objects (e.g., to receive the query result) and filter objects (e.g., to create a filter for a query). According to some embodiments, the user may drag and drop icons associated with presentation and/or definition data to define an object. For example, presentation information might include a business name, a description, and/or qualification information (e.g., dimension, attribute, property, measure). Note that a user may define a continuous event-driven query using objects with business terms (instead of working directly with the different data sources).

According to some embodiments, a user may create a "window" that defines a bounded portion of an event stream. For example, the user might provide a window time parameter (e.g., all events in the last hour or in the current hour), a window count parameter (e.g., the last fifty events), window sliding information, window cycling information, window unique information, window top information (e.g., the events with the thirty highest values), and/or window bottom information.

Figure 6:
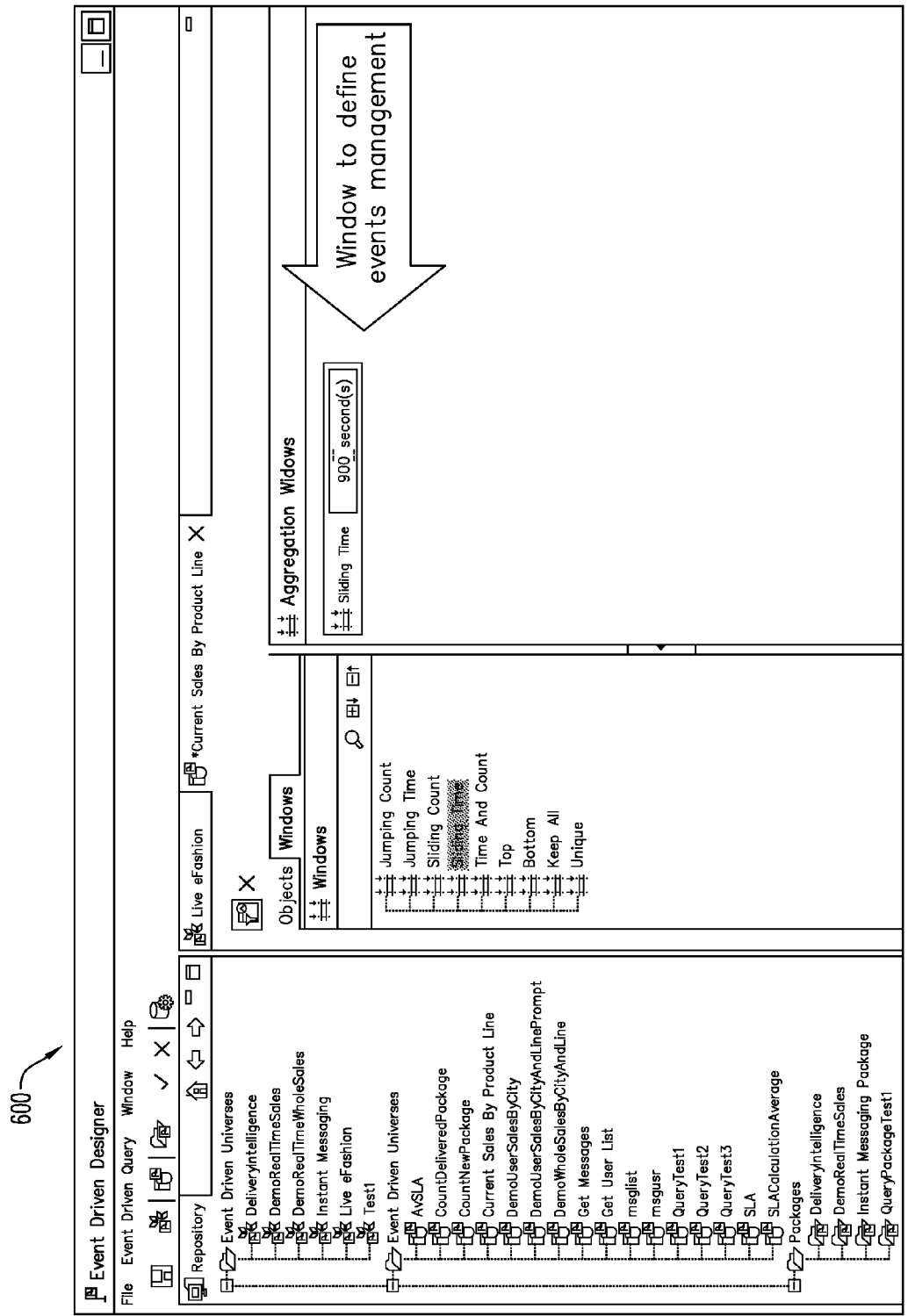
FIG. 6 illustrates a graphical user interface associated with window parameter definition in accordance with some embodiments.

FIG. 6 illustrates a GUI 600 associated with window parameter definition in accordance with some embodiments. In this case, the GUI 600 may be used to create a window to define events management for a business user. For example, the business user might drag and drop icons to aggregate several different types of windows (e.g., a sliding time window of 900 seconds). In this way, the user can define which events he or she is interested in.

Figure 7:
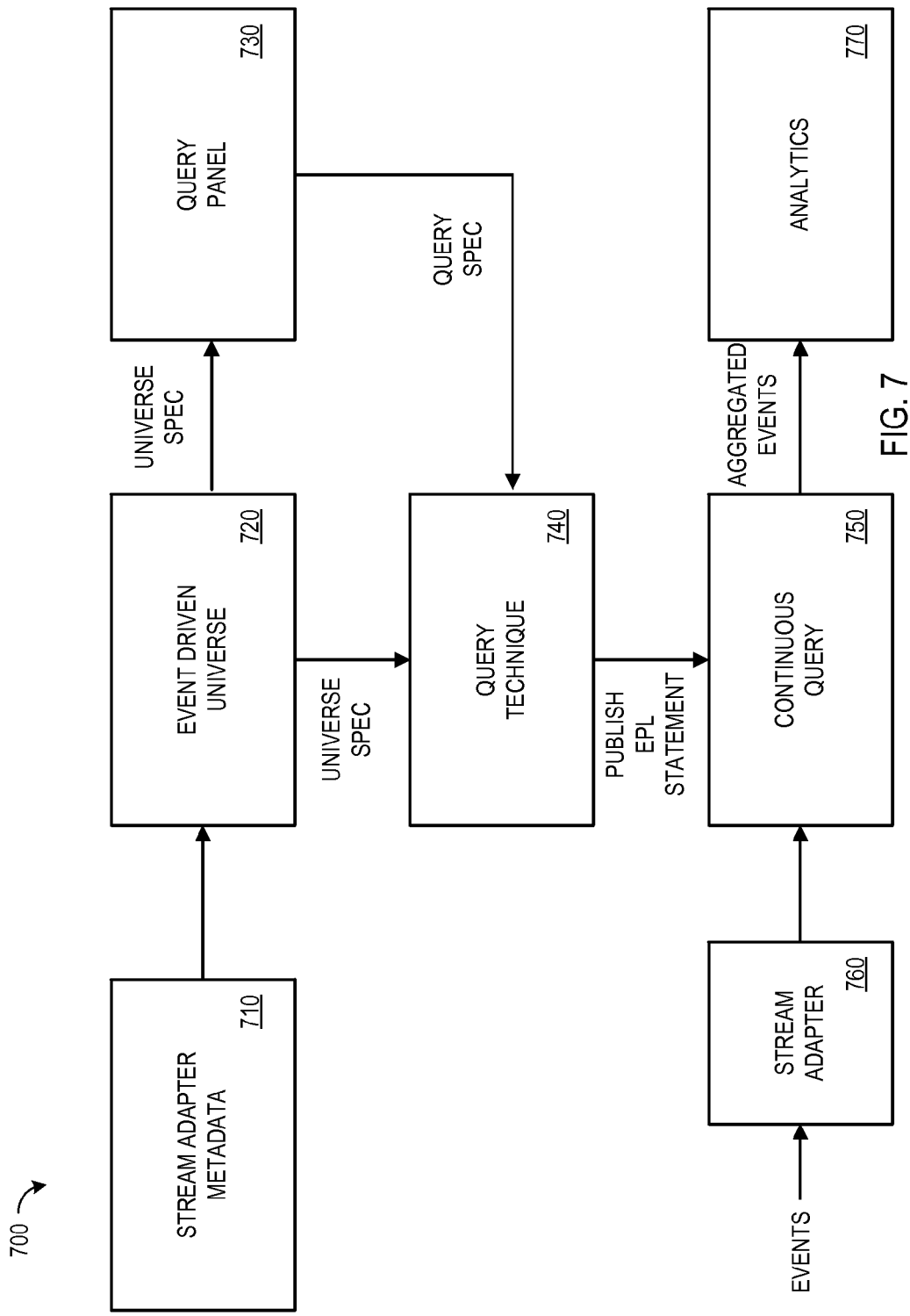
FIG. 7 is an event-driven business information semantic layer component diagram according to some embodiments.

FIG. 7 is an event-driven business information semantic layer component diagram 700 according to some embodiments. The component diagram 700 includes one or more stream adapter metadata components 710 that may, for example, be associated with stream adapters that are installed on an application server and that are self-defining (e.g., column, type, nullable). According to some embodiments, such adapters may be developed using a Java-based software development kit.

The stream adapter metadata component 710 may provide information to an event driven universe component 720. The event driven universe component 720 may, for example, be based on an entity-relationship model. For example, with respect to the entity portion of such a model, stream adapter metadata might be provided using a table/field metaphor. Moreover, each table may have a type, a name, and list of associated fields (which in turn each have a name and type). According to some embodiments, an entity might comprise an alias of another entity. With respect to the relationship portion of such a model, various types of joining operations might be supported (e.g., inner joins, right joins, left joins, and/or full outer joins). According to some embodiments, multiple relationships may exist between entities.

The event driven universe component 720 may further utilize business objects. For example, the business object metadata might include a name and description, an object type (e.g., dimension, measure, detail, and pre-condition), a data type, an aggregation type or distinction, a formula (e.g., math, concatenation, or trim). According to some embodiments, classes may be used to order business objects.

The event driven universe component 720 may provide a universe specification to a query panel component 730. The query panel component 730 may be associated with, for example, a result object list defined when a user drags and drops a universe object into a result object area. The user may be able to publish, start, stop, or delete a query. According to some embodiments, a sort may be defined on the result objects. The query panel component 730 may further be associated with object tree conditions defined when a user drags and drops a universe object into a tree condition structure. Note that an object condition may be associated with a main operand (e.g., a universe object, one or more operators, and a fixed value or prompt operand).

The query panel component 730 may still further be associated with an aggregation window defining a set of events in an event stream. The window might be defined using a time parameter (e.g., ten hours), a number of events (e.g., the last ten thousand events on each dimension), the highest or lowest values, or uniqueness (e.g., the last event on each dimension).

A query technique component 740 may receive the universe specification from the event driven universe component 720 along with a query specification from the query panel 730. Based on the universe specification and the query specification, the query technique component 740 may automatically generate and publish one or more EPL statements to create a continuous query 750. The continuous query 750 receives information about event streams via a stream adapter 760 and provides aggregated event information to an analytics component 770.

Figure 8:
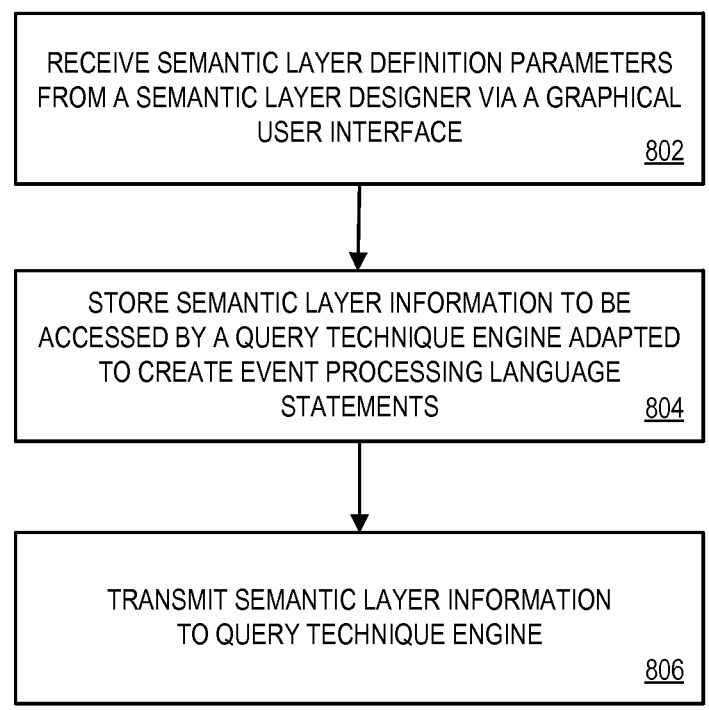
FIG. 8 is a flow diagram of a method to facilitate definition of semantic layer information according to some embodiments.

FIG. 8 is a flow diagram of a method to facilitate definition of semantic layer information according to some embodiments. At 802, semantic layer definition parameters are received. The semantic layer definition parameters may be received, for example, from an Information Technology (IT) semantic layer designer via a GUI.

At 804, semantic layer information is stored based on the semantic layer definition parameters. The semantic layer information may, for example, be stored to be later transmitted at 806 to a query technique engine adapted to create event processing language statements based on (i) continuous query definition parameters from a user and (ii) the semantic layer information.

According to some embodiments, at least some of the semantic layer information is associated with a stream adapter metadata component providing metadata associated with connected stream adapters. Moreover, at least some of the semantic layer information may be associated with an event driven universe specification module that enables creation of an event driven universe specification with entities and relationships between entities. In some embodiments, at least some of the semantic layer information is associated with a query panel component that enables creation of a query based on the event driven universe using an interactive user interface.

Figure 9:
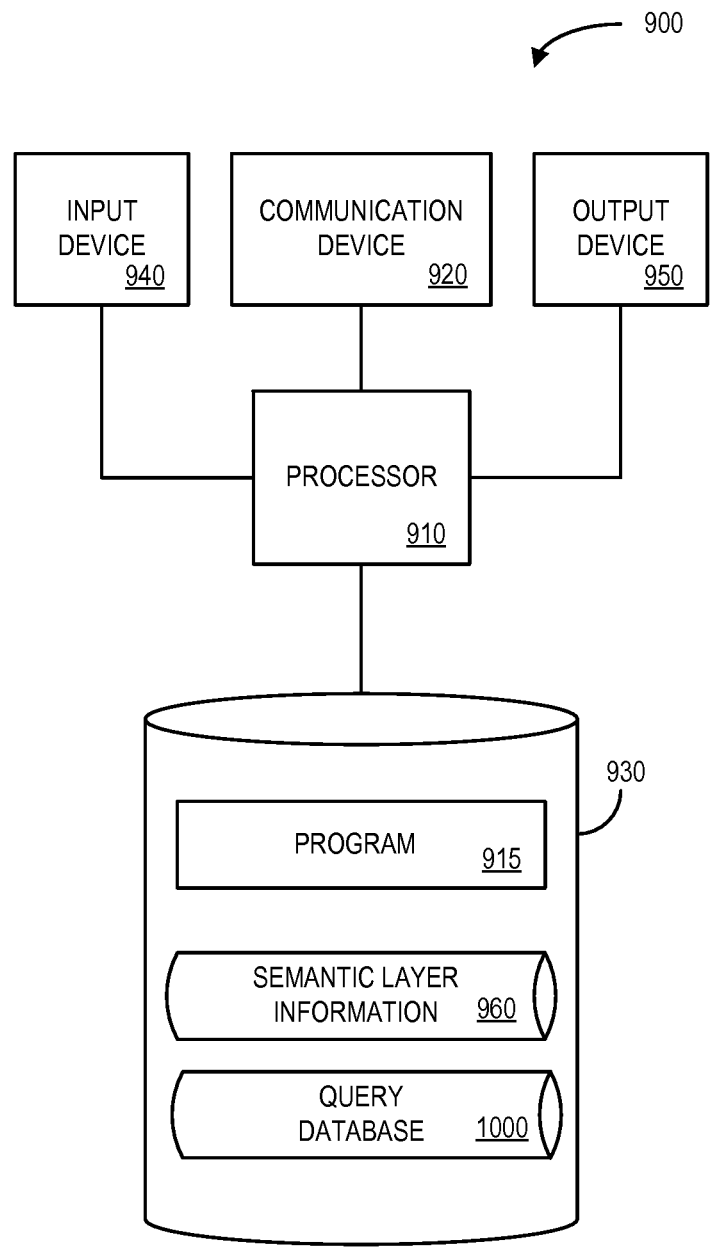
FIG. 9 is a block diagram of an apparatus in accordance with some embodiments of the present invention.

FIG. 9 is a block diagram of an apparatus 900 in accordance with some embodiments of the present invention. The apparatus 900 might, for example, be associated with a server such as the server device 110 illustrated in FIG. 1. The apparatus 900 comprises a processor 910, such as one or more INTEL® Pentium® processors, coupled to a communication device 920 configured to communicate via one or more communication networks (not shown in FIG. 9). The communication device 920 may be used to exchange information with one or more client devices and/or event stream sources.

The processor 910 is also in communication with an input device 940. The input device 940 may comprise, for example, a keyboard, a mouse, or computer media reader. Such an input device 940 may be used, for example, to define queries and/or query packages. The processor 910 is also in communication with an output device 950. The output device 950 may comprise, for example, a display screen or printer. Such an output device 950 may be used, for example, to provide reports and/or displays associated with queries and/or query packages.

The processor 910 is also in communication with a storage device 930. The storage device 930 may comprise any appropriate information storage device, including combinations of magnetic storage devices (e.g., hard disk drives), optical storage devices, and/or semiconductor memory devices such as Random Access Memory (RAM) devices and Read Only Memory (ROM) devices.

The storage device 930 stores a program 915 for controlling the processor 910. The processor 910 performs instructions of the program 915, and thereby operates in accordance with any embodiments of the present invention described herein. For example, the processor 910 may receive a continuous query definition parameter created by a business user. The processor 910 may also retrieve semantic layer information 960 associated with a complex event processing engine, the complex event processing engine being adapted to receive multiple business information event streams.

According to some embodiments, the processor 910 creates a statement (e.g., EPL statement or set of statements) based on (i) the continuous query definition parameter created by the business user and (ii) the semantic layer information 960. The processor 910 may then provide the statement to the complex event processing engine so as to establish a continuous query at the complex event processing engine, the continuous query providing output data based on events in the business information event streams. The processor 910 may subsequently receive an indication from the complex event processing engine (e.g., a notification) in connection with the continuous query and transmit information, based on the received indication, to one or more business users via a push-model.

As used herein, information may be "received" by or "transmitted" to, for example: (i) the apparatus 900 from other devices; or (ii) a software application or module within the apparatus 900 from another software application, module, or any other source. As shown in FIG. 9, the storage device 930 may also store semantic layer information 960 and a query database 1000 (described with respect to FIG. 10) according to some embodiments. The illustration and accompanying descriptions of devices and databases presented herein are exemplary, and any number of other arrangements could be employed besides those suggested by the figures. For example, multiple databases associated with different types of business information and/or clients might be associated with the apparatus 900.

Figure 10:
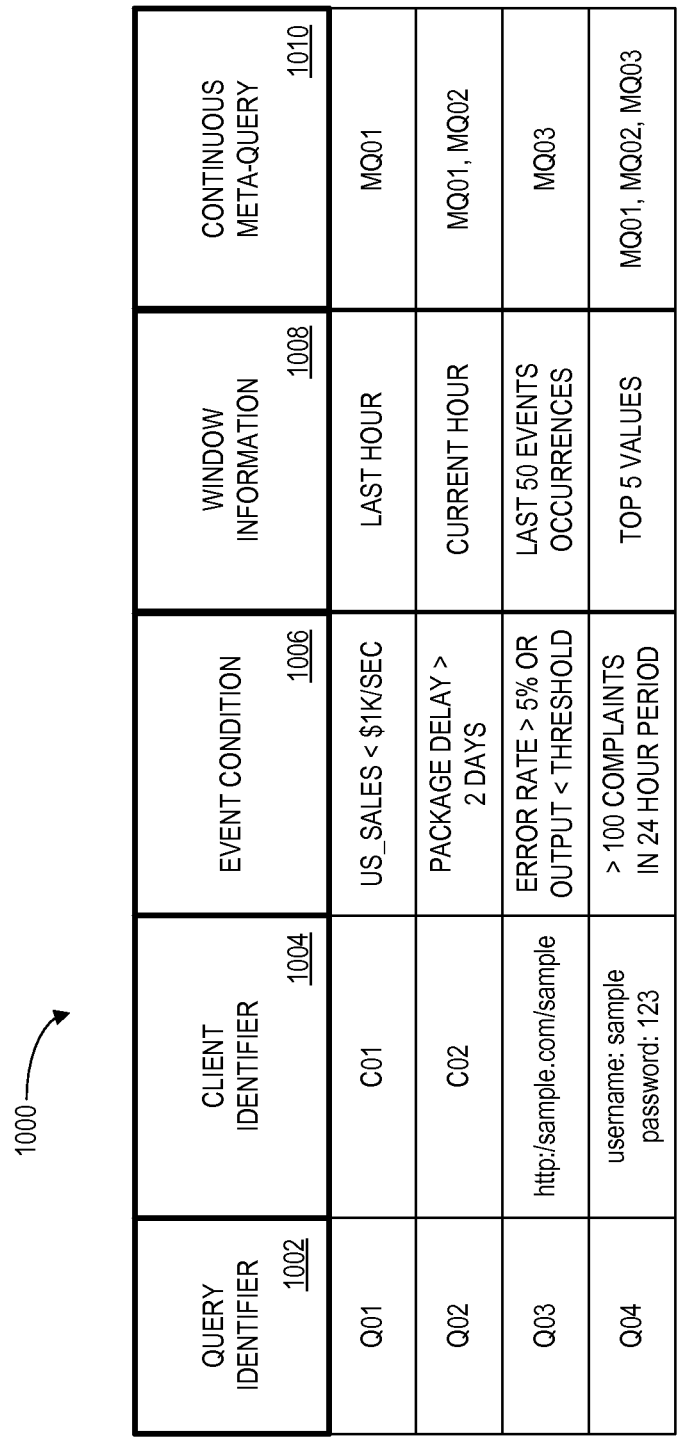
FIG. 10 is a tabular representation of a portion of a query database according to some embodiments.

FIG. 10 is a tabular representation of a portion of a query database 1000 according to some embodiments. The table includes entries identifying queries that have been created for remote client devices. The table also defines fields 1002, 1004, 1006, 1008, 1010 for each of the entries. The fields specify: a query identifier 1002, client identifier 1004, an event condition 1006, window information 1008, and continuous meta-query information 1010. The information in the database 1000 may be created and updated based on information received from client devices and/or system designers.

The query identifier 1002 may be, for example, an alphanumeric code associated with a particular subscription query executing for a client. The client identifier 1004 may be, for example, an alphanumeric code associated with the client who is subscribing to the query, a Uniform Resource Locator (URL) address associated with the client, a key, a token, or a user name and password. The event condition 1006 may define when information should be "pushed" to the client. The window information 1008 may define which events in a stream are of interest to the user. The continuous meta-query information 1010 may be, for example, one or more alphanumeric codes associated with continuous "meta-queries" as described in connection with FIGS. 12 and 13. According to some embodiments, the database may further associated one query identifier 1002 with one or more other query identifiers 1002 in the database.

Figure 11:
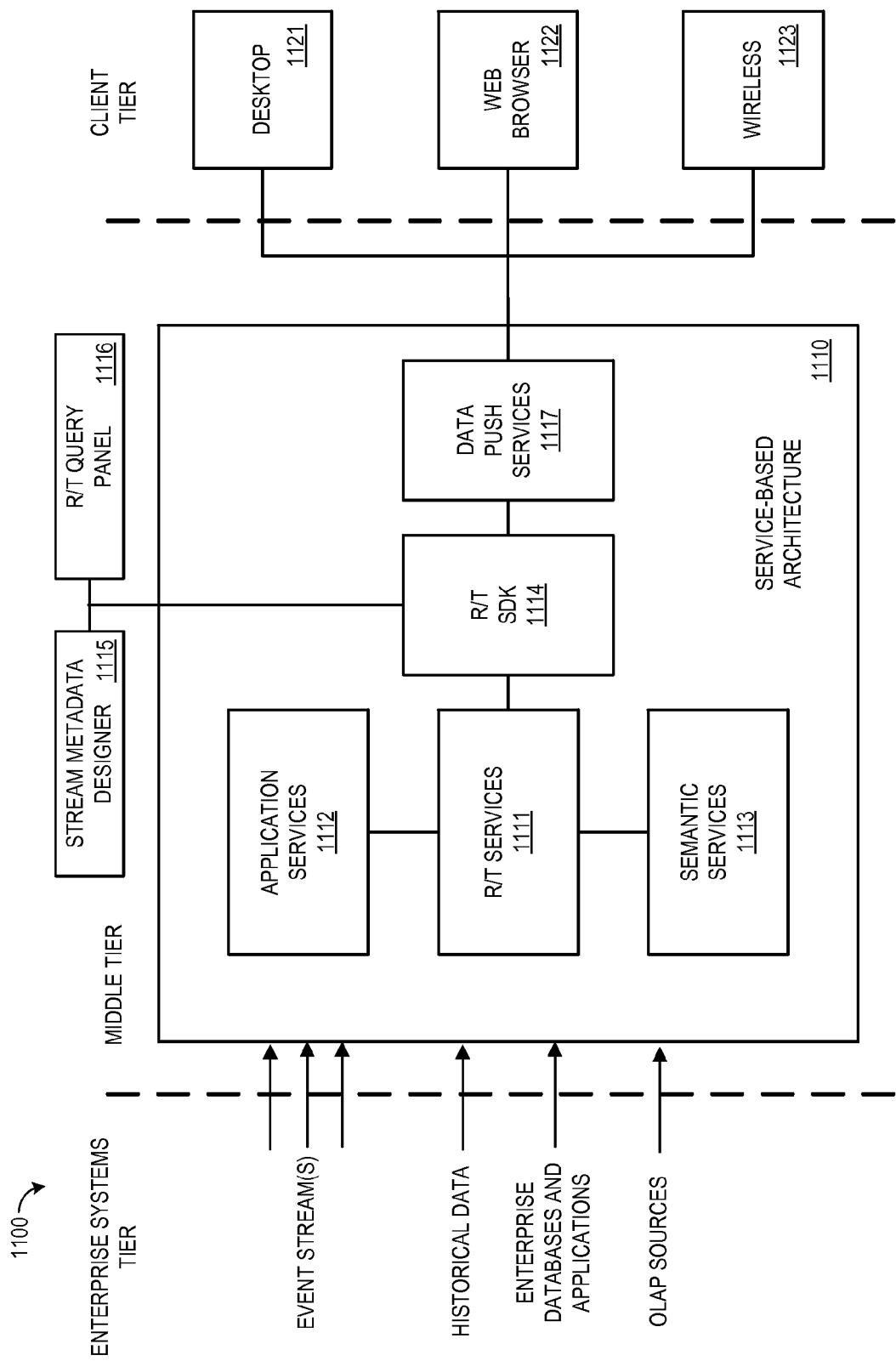
FIG. 11 is a block diagram of a system according to an exemplary embodiment of the present invention.

FIG. 11 is a block diagram of a system 1100 according to an exemplary embodiment of the present invention. According to this embodiment, at least one enterprise system tier or component may be adapted to provide at least one Real Time (R/T) business information event stream to a middle tier (e.g., including a service-based architecture 1110). Moreover, the event streams may be associated with one or more event stream adapters that provide data to an event driven engine. The event driven engine may, in turn, provide data to a R/T web server to be distributed to various remote clients 1121, 1122, 1123 in a client user interaction tier or component.

The service-based architecture might further receive historical data (e.g., to be used to correlate and compare with R/T data), information from enterprise databases and applications, and/or data from OLAP sources (e.g., associated with a multi-dimensional data schema such as a hypercube). Note, however, that embodiments may be associated with other types of information including data described by a metadata model. Such data may also include information stored in one or more data sources, such as relational databases.

A client user interaction tier or component may be adapted to transmit an HTTP request to the service-based architecture 1110 in connection with a query associated with one or more events in the at least one real-time business information event stream. Examples of devices in the client tier may include a desktop 1121 (e.g., a dashboard or widget running at a PC), a web browser 1122, and a wireless device 1123.

The service-based architecture 1110 may receive the R/T business information event stream and an HTTP request (e.g., a subscription query) from a client device. The data push services 1112 may further push R/T business information to a client device when the condition associated with the query is subsequently satisfied by the R/T business information event stream.

The service based architecture 1110 may include a number of business services nodes, such as R/T services 1111 that automatically generate EPL statements for a continuous query based at least in part on information retrieved from semantic services 1113. The R/T services 111 may also process historical and stream-based information. Application services 1112 may provide security, session, and administrative functions. According to some embodiments, a web query may be defined using semantic layer objects and/or interfaces contained in the definitions of event streams The service based architecture 1110 may further include a number of application server container components, such as a R/T Software Development Kit (SDK) 1114 (e.g., including an authoring component and an event driven analytics alerts component). According to some embodiments, the R/T SDK operates in connection with a stream metadata designer 1115 and/or a R/T query panel 1116 to facilitate the automatic and efficient definition of queries.

According to some embodiments, the service-based architecture 1110 may request parameters from a client. For example the service-based architecture 1110 may request token information (allowing the server to uniquely identify the client), timeout information (specifying a maximum time permitted for the server to block the connection with the client), a query package identifier (allowing the server to identify appropriate queries as described with respect to FIG. 5), and/or a list of query input objects (each object including, for example, a timestamp to let the server synchronize with the client, an output limit specifying a rate at which the server may send events to the client, and/or a list of values for each prompt of the query that were specified by a particular user). The service-based architecture 1110 may also send to the client a list of query output objects (each object including, for example, a timestamp to let the client synchronize with the server and/or a data table listing the events that correspond to the user query).

Figure 12:
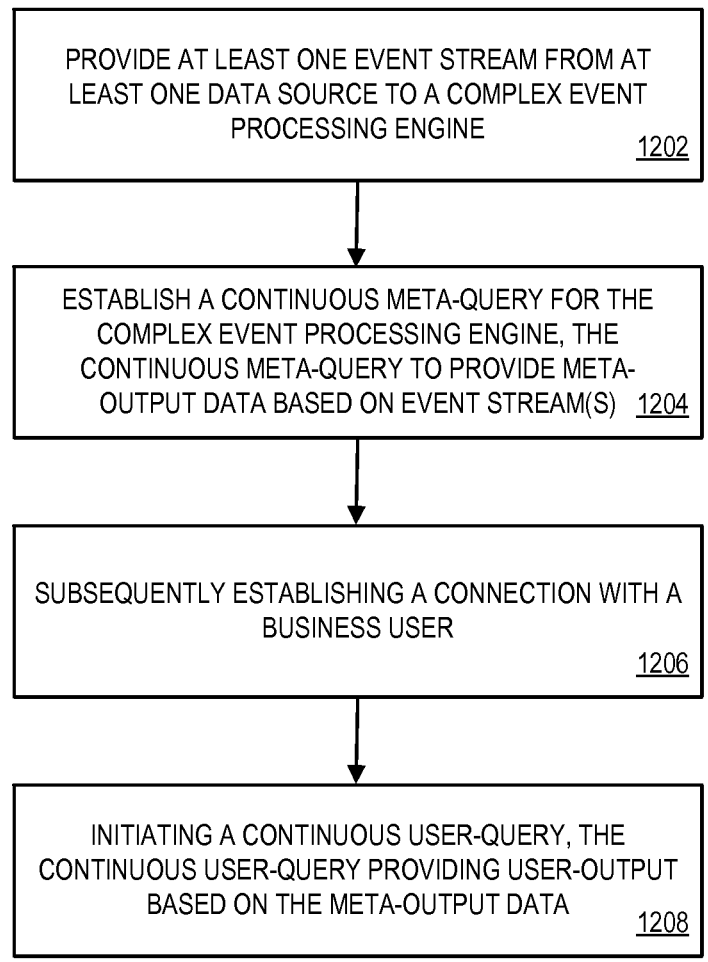
FIG. 12 is a flow diagram of a method associated with continuous meta-queries according to some embodiments.

Consider a query wherein a user is interested in the average production rate in a factory over the past six hours. When the user runs the query, the server might start to collect event information—but the data would not initially represent an entire six hour period. To avoid such a result, FIG. 12 is a flow diagram of a method associated with continuous "meta-queries" according to some embodiments.

At 1202, at least one event stream from at least one data source is provided to a complex event processing engine. At 1204, a continuous meta-query is established, at a query technique engine, for the complex event processing engine, the continuous meta-query providing meta-output data based on the at least one event stream. This step might be performed for example, when a designer creates a desktop dashboard widget (such as the one illustrated in FIG. 2).

At 1206, a connection with a business user is subsequently established. Moreover, a continuous user-query is initiated at 1208, the continuous user-query providing user-output data based on the meta-output data. Since the meta-output data was being collected since the designer created the meta-query (and not just since the business user activated his or her particular dashboard), information associated with an entire window may be available (e.g., production numbers for the last six hours). That is, the continuous user-query is able to provide user-output data based on meta-output data including at least some data associated with a time before the connection with the business user was established.

Another advantage of such continuous meta-queries is that all users will be accessing the same information. For example, a first business user who actives a dashboard with a one hour window may always see the same information as another business user who activates that dashboard ten minutes later. When a user is no longer connected (e.g., as represented by the dashed user-query D 1322 in FIG. 13), any associated meta-queries may continue to gather information.

Figure 13:
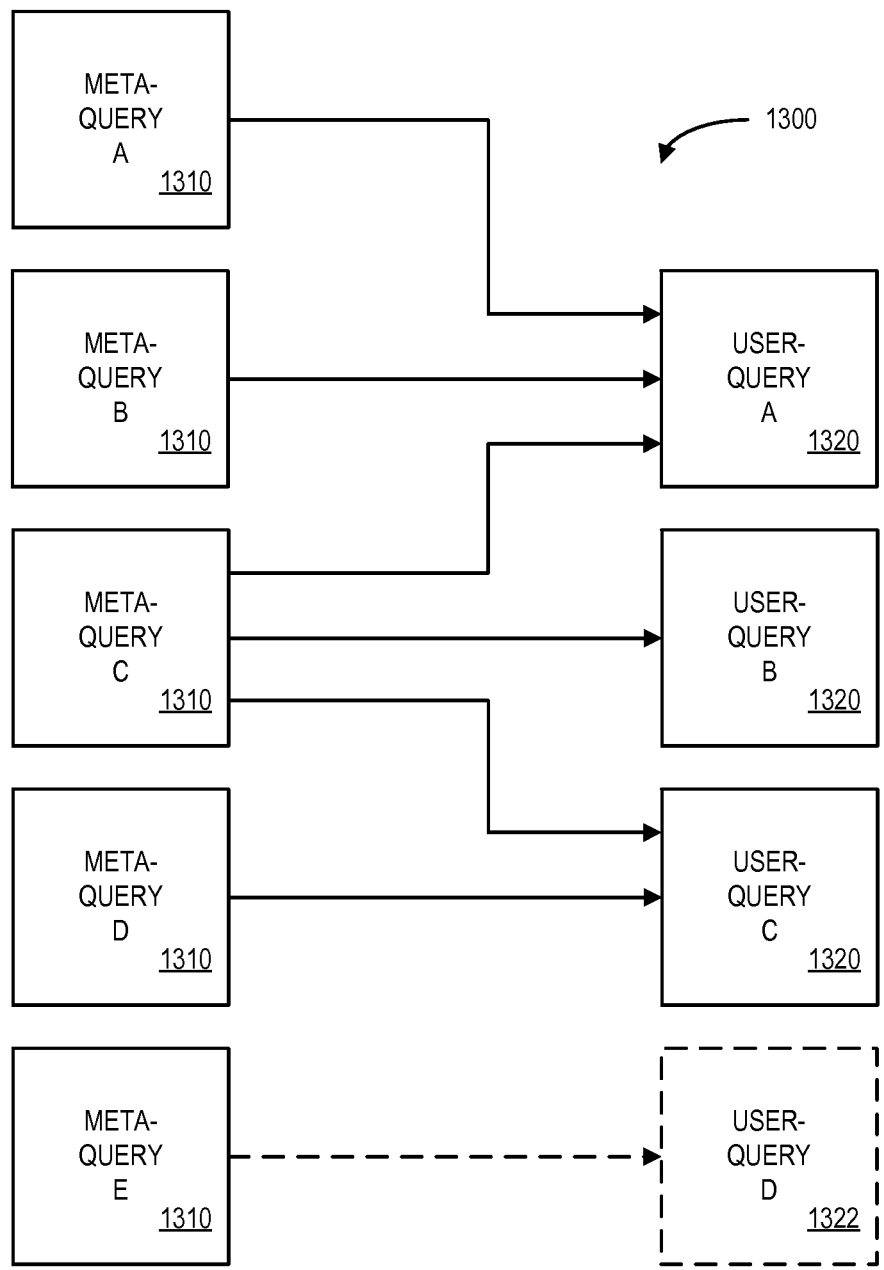
FIG. 13 is an illustration of continuous meta-queries and related user-queries according to some embodiments.

Note that a plurality of continuous user-queries provide data based on meta-output data from a single meta-query. Moreover, user-output data for a single user-query may be based on data associated with a plurality of continuous meta-queries. For example, FIG. 13 is an illustration 1300 of continuous meta-queries 1310 and related user-queries 1320 according to some embodiments. In this case, the single user-query A 1320 is linked to meta-queries A, B, and C. Similarly, the single meta-query C is linked to user-queries A, B, and C.

According to some embodiments, a continuous user-query may further be associated with a filter operation, a complex formula, aggregation information, a join operation, an order operation, a group operation, an output rate parameter, and/or a tree of conditions. Moreover, a continuous user-query may be associated with user security information. For example, a set of meta-data queries might continually collect information from event streams. When a connection with a particular business user is established, his or her login name and password may be required to determine which of that collected information will be accessible.

As a result of embodiments described herein, an event-based push model may be implemented to provide business information to a user and systems and methods are described to facilitate the creation of event queries. Moreover, a server may process information using an end-to-end event driven architecture such that information is pushed to a user with relatively little latency. Embodiments may also be scalable (e.g., thousands of users might be supported by a server), provide stream filtering on the server side, and/or ensure that a client receives only the data of interest to a user.

Note that the creation of a semantic (e.g., abstract) layer and/or event universe may leverage the automatic creation of continuous queries for a complex event processing engine that works on top of event streams or event driven data sources (e.g., enterprise messaging buses).

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware, process steps, and data configurations have been described herein, note that other techniques may be provided in accordance with embodiments of the present invention (e.g., some of the data associated with the applications and databases described herein may be combined or stored in separate systems). Similarly, although a particular information flow and user interactions have been given as examples, other approaches may be implemented. For example, a response transmitted from a server to a client might be associated with an incremental change in data (as compared to a previously transmitted response).

Applicants have discovered that embodiments described herein may be particularly useful in connection with enterprise business information (e.g., the embodiments might be implemented without major changes to an enterprise infrastructure). Note, however, that other types of event streams and databases might similarly benefit from various embodiments, including those associated with systems that process large amounts of financial information.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A non-transitory computer-readable medium having stored thereon processor-executable instructions that when executed by a processor result in the following:
providing at least one event stream from at least one data source to an event processing engine;
prior to establishing a connection with any user, automatically establishing, by a processor at a query technique engine, a first continuous meta-query for the event processing engine, the first continuous meta-query providing meta-output data based on the at least one event stream, the meta-output data being collected from a time prior to establishing a connection with any user and beginning at the creation of the first continuous meta-query;
subsequent to establishment of the first continuous meta-query, establishing a connection with a remote user;
receiving, at the query technique engine, continuous query definition parameters for a continuous user-query from the user via a graphical user interface;
retrieving, at the query technique engine, semantic layer information associated with the event processing engine;
automatically creating event processing language statements by the processor at the query technique engine, the event processing language statements being created based on (i) the continuous query definition parameters from the user and (ii) the semantic layer information;
arranging for the event processing language statements to be provided to the event processing engine so as to establish the continuous user-query at the event processing engine, the continuous user-query providing user-output data based on a combination of newly occurring events in the event stream and at least a portion of said meta-output data that was provided before the connection with the user was established;
subsequently de-establishing the connection with the user; and
halting the continuous user-query without halting the first continuous meta-query.

2. The computer readable medium of claim 1, wherein the semantic layer information includes at least one of: (i) schema definitions, (ii) tables defining attributes, (iii) business object metadata, (iv) metadata based on an entity relationship model, (v) a metadata name, (vi) a metadata description, (vii) a metadata object type, (viii) dimension, measure, detail, or pre-condition object definitions, (ix) a metadata data type, (x) a metadata aggregation type, (xi) metadata distinction information, (xii) metadata formula information, (xiii) stream adapter metadata, (xiv) event driven universe metadata, or (xv) query panel information.

3. The computer readable medium of claim 1, wherein the semantic layer information includes at least one of: (i) window information defining a bounded portion of the event stream, (ii) a window time parameter, (iii) a window count parameter, (iv) window sliding information, (v) window cycling information, (vi) window unique information, (vii) window top information, or (viii) window bottom information.

4. The computer-readable medium of claim 1, wherein the continuous query definition parameters from the user include at least one of: (i) an event driven universe, (ii) an event driven query, (iii) a class, (iv) an object, (v) an adapter, (vi) a source stream, (vii) a target, or (viii) a filter.

5. The computer-readable medium of claim 1, wherein execution of the instructions further results in:
responsive to the output data, transmitting information to the user via a push-model.

6. The computer-readable medium of claim 5, wherein the transmitted information is associated with at least one of: (i) a web service associated with a client, (ii) a desktop widget application associated with a client, (iii) a dashboard application associated with a client, (iv) a web analytic application associated with a client, or (v) a web browser application associated with a client.

7. The computer-readable medium of claim 5, wherein the information is transmitted to at least one of: (i) a personal computer, or (ii) a wireless device.

8. The computer-readable medium of claim 1, wherein the continuous user-query at the event processing engine is associated with at least one of: (i) an event aggregation, (ii) an event abstraction, or (iii) a complex event.

9. The computer-readable medium of claim 1, wherein a plurality of continuous user-queries provide data based on the meta-output data.

10. The computer-readable medium of claim 1, wherein the user-output data is based on data associated with a plurality of continuous meta-queries.

11. The computer-readable medium of claim 1, wherein the first continuous meta-query is further associated with a filter operation.

12. The computer-readable medium of claim 11, wherein the first continuous meta-query is further associated with at least one of: (i) a complex formula, (ii) aggregation information, (iii) a join operation, (iv) an order operation, (v) a group operation, (vi) an output rate parameter, or (vii) a tree of conditions.

13. The computer-readable medium of claim 1, wherein the continuous user-query is further associated with user security information and access to the continuous meta-output is based at least in part on the user security information.

14. A computer-implemented method, comprising:
providing at least one event stream from at least one data source to an event processing engine;
prior to establishing a connection with any user, automatically establishing, by a processor at a query technique engine, a first continuous meta-query for the event processing engine, the first continuous meta-query providing meta-output data based on the at least one event stream, the meta-output data being collected from a time prior to establishing a connection with any user and beginning at the creation of the first continuous meta-query;
subsequently establishing a connection with a remote user;
receiving, at the query technique engine, continuous query definition parameters for a continuous user-query from the user via a graphical user interface;
retrieving, at the query technique engine, semantic layer information associated with the event processing engine;
automatically creating event processing language statements by the processor at the query technique engine, the event processing language statements being created based on (i) the continuous query definition parameters from the user and (ii) the semantic layer information;
arranging for the event processing language statements to be provided to the event processing engine so as to establish the continuous user-query at the event processing engine, the continuous user-query providing output data based on newly occurring events in the event stream combined with at least a portion of said meta-output data that was provided before the connection with the user was established;
subsequently de-establishing the connection with the user; and
halting the continuous user-query without halting the first continuous meta-query.

15. A system, comprising:
an event processing engine to receive at least one event stream from at least one data source;
a query technique engine including a processor to: (i) prior to establishing a connection with any user, automatically establish a first continuous meta-query for the event processing engine, the first continuous meta-query providing meta-output data based on the at least one event stream, the meta-output data being collected from a time prior to establishing a connection with any user and beginning at the creation of the first continuous meta-query, (ii) subsequently establish a connection with a remote user, (iii) receive continuous query definition parameters for a continuous user-query from the user via a graphical user interface, (iv) retrieve semantic layer information associated with the event processing engine, and (v) automatically create event processing language statements based on (a) the continuous query definition parameters from the user and (b) the semantic layer information;
wherein it is arranged for the event processing language statements to be provided to the event processing engine so as to establish the continuous user-query at the event processing engine, the continuous user-query providing output data based on newly occurring events in the event stream combined with at least a portion of said meta-output data that was provided before the connection with the user was established;
and further wherein the connection with the user is subsequently de-established and the continuous user-query is halted without halting the first continuous meta-query.

* * * * *